(12) United States Patent
Hartwich et al.

(10) Patent No.: US 9,262,365 B2
(45) Date of Patent: Feb. 16, 2016

(54) METHOD AND DEVICE FOR SERIAL DATA TRANSMISSION AT A SWITCHABLE DATA RATE

(75) Inventors: Florian Hartwich, Reutlingen (DE); Tobias Lorenz, Stuttgart (DE); Christian Horst, Dusslingen (DE); Ralf Machauer, Ludwigsburg (DE); Frank Voetz, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 354 days.

(21) Appl. No.: 13/824,790

(22) PCT Filed: Sep. 20, 2011

(86) PCT No.: PCT/EP2011/066326
§ 371 (c)(1),
(2), (4) Date: Jun. 10, 2013

(87) PCT Pub. No.: WO2012/038430
PCT Pub. Date: Mar. 29, 2012

(65) Prior Publication Data
US 2013/0290580 A1    Oct. 31, 2013

(30) Foreign Application Priority Data
Sep. 22, 2010   (DE) .......................... 10 2010 041 223

(51) Int. Cl.
*G06F 13/42* (2006.01)
*H04L 12/40* (2006.01)

(52) U.S. Cl.
CPC ............ *G06F 13/42* (2013.01); *H04L 12/4013* (2013.01); *H04L 12/40032* (2013.01); *H04L 2012/40215* (2013.01)

(58) Field of Classification Search
CPC ...................................................... G06F 13/42
See application file for complete search history.

(56) References Cited

U.S. PATENT DOCUMENTS 7,472,216 B2 * 12/2008 Fredriksson et al. ......... 710/305
7,934,039 B2 *  4/2011 Fredriksson et al. ......... 710/305
(Continued)

FOREIGN PATENT DOCUMENTS

| CN | 101494519 | 6/2011 |
| DE | 100 00 305 | 7/2001 |

(Continued)

OTHER PUBLICATIONS

Van Herrewege, Anthony, Dave Singelee, and Ingrid Verbauwhede. "CANAuth—a simple, backward compatible broadcast authentication protocol for CAN bus." ECRYPT Workshop on Lightweight Cryptography 2011. 2011.*

(Continued)

*Primary Examiner* — Brian Misiura
(74) *Attorney, Agent, or Firm* — Kenyon & Kenyon LLP

(57) ABSTRACT

In a method for enabling transmission of larger data quantities relatively rapidly in a data network, the sent data frames have a logical structure according to CAN Specification ISO 11898-1, the bit length in time within a data frame being able to assume at least two different values; for a first specifiable range within the data frame, the bit length in time being greater than, or equal to a specified minimum value of approximately one microsecond and in at least one second specifiable range within the data frame the bit length in time compared to the first range is at least halved, preferably less than halved; the change of the bit length in time being implemented by using at least two different scaling factors for setting the bus time unit relative to a shortest time unit or the oscillator clock pulse during running operation.

13 Claims, 6 Drawing Sheets

(56) References Cited

U.S. PATENT DOCUMENTS

| | | | | |
|---|---|---|---|---|
| 8,897,319 | B2* | 11/2014 | Fredriksson | H04L 29/0619 370/464 |
| 2006/0123176 | A1* | 6/2006 | Fredriksson et al. | 710/305 |
| 2008/0253770 | A1 | 10/2008 | Mori | |
| 2009/0063909 | A1* | 3/2009 | Fredriksson et al. | 714/49 |
| 2013/0294460 | A1* | 11/2013 | Hell | 370/470 |
| 2013/0294540 | A1* | 11/2013 | Hell | 375/295 |
| 2014/0023089 | A1* | 1/2014 | Hartwich et al. | 370/468 |
| 2014/0071995 | A1* | 3/2014 | Hartwich | 370/468 |
| 2014/0129900 | A1* | 5/2014 | Hartwich | 714/758 |
| 2014/0169414 | A1* | 6/2014 | Moen | 375/218 |
| 2014/0223258 | A1* | 8/2014 | Hartwich et al. | 714/758 |
| 2014/0244871 | A1* | 8/2014 | Hartwich et al. | 710/106 |
| 2014/0245102 | A1* | 8/2014 | Hartwich | 714/758 |
| 2014/0258571 | A1* | 9/2014 | Hartwich et al. | 710/106 |
| 2014/0258581 | A1* | 9/2014 | Hartwich et al. | 710/307 |
| 2014/0337549 | A1* | 11/2014 | Hartwich et al. | 710/106 |

FOREIGN PATENT DOCUMENTS

| | | |
|---|---|---|
| DE | 101 53 085 | 5/2003 |
| DE | 103 11 395 | 9/2004 |
| DE | 10 2007 051 657 | 10/2007 |
| RU | 2333604 C2 | 9/2008 |
| WO | WO 95/06378 | 3/1995 |
| WO | WO 2009/109592 | 9/2009 |

OTHER PUBLICATIONS

Sheikh, I.; Short, M.; Yahya, K., "Analysis of overclocked controller area network," Networked Sensing Systems (INSS), 2010 Seventh International Conference on , vol., No., pp. 37,40, Jun. 15-18, 2010.*

I. Sheikh and M. Short, "Improving information throughput in can networks: Implementing the dual-speed approach," in 8th International Workshop on Real-Time Networks RTN'09, Dublin, Ireland, Jun. 2009.*

"CAN+: A new backward-compatible Controller Area Network (CAN) protocol with up to 16x higher data rates"; Tobias Ziermann, Stefan Wildermann, and Jurgen Teich; 6 pages, Dated 2009.*

"Self-organization and Optimization of Priority-based Communication Buses"—by Tobias Ziermann; 195 pages, Dated 2013.*

International Search Report for PCT/EP2011/066326, dated Nov. 28, 2011.

Cena G, et al.: "Overclocking of controller area networks", Electronics Letters, IEEE Stevenage, vol. 35, No. 22, Oct. 28, 1999, pp. 1923-1925.

Sheikh Imran & Michael Short; "Improving throughput in Can networks: Implementing the dual-speed approach", Prepring Proceedings Real-Time Networks, Jun. 30, 2009.

Robert Bosch GmbH: CAN with Flexible Data-Rate: White Paper, Version 1.0, Internet Citation, Apr. 2011, pp. 1-13.

* cited by examiner

METHOD AND DEVICE FOR SERIAL DATA TRANSMISSION AT A SWITCHABLE DATA RATE

BACKGROUND OF THE INVENTION

1. Field of the Invention

The present invention relates to a method and a device for the transmission of data between at least two users of a bus system, in which the time duration of the bits transmitted is able to be switched over between at least two different values.

2. Description of the Related Art

From published German patent application document DE 100 00 305 A1, for example, the Controller Area Network as well as a "Time-Triggered CAN" (TTCAN)-designated broadening of the CAN is known. The media access control method used in the CAN is based on a bit-wise arbitration. In a bit-wise arbitration, a plurality of user stations are simultaneously able to transmit data via the channel of the bus system, without thereby interfering with the data transmission. Furthermore, the user stations are able to ascertain the logical state (0 or 1) of the channel while transmitting a bit over the channel. If a value of the bit sent does not correspond to the ascertained logical state of the channel, the user station terminates the access to the channel. In CAN, the bit-wise arbitration is usually carried out in an arbitration field within a data frame that is to be transmitted via the channel. After a user station has sent the arbitration field completely to the channel, it knows that it has exclusive access to the channel. Consequently, the end of the transmission of the arbitration field corresponds to the beginning of an enable interval, within which the user station is able to use the channel exclusively. According to the protocol specification of the CAN, other user stations may not access the channel, that is, send data to the channel, until the sending user station has transmitted a checksum field (CRC field) of the data frame. Thus, an end point of the transmission of the CRC field corresponds to the end of the enable interval.

Because of the bit-wise arbitration, a non-destructive transmission of the data frame over the channel is achieved. Because of this, good real time properties of the CAN come about, whereas media access control methods, in which the data frame sent by a user station is able to be destroyed during transmission via the channel, based on a collision with a further data frame sent by another station, have a clearly more unfavorable real time behavior since, based on the collision and the new transmission of the data frame required thereby, a delay in the data transmission comes about.

The protocols of the CAN are particularly suitable for transmitting short messages under real time conditions. If larger data blocks are to be transmitted via the CAN domain, the relatively low bit rate of the channel becomes a limiting factor. In order to assure the correct functioning of the bit-wise arbitration, during the arbitration, for the transmission of a bit, a minimum duration, that is first of all a function of the extension of the bus system, the signal propagation speed on the channel and intrinsic processing times in the interface modules of the bus users, has to be maintained, because all the bus users have to have a uniform picture of the state of the bus (0 or 1) and equal priority access to the state of the bus. Therefore, the bit rate cannot be increased without any problem by reducing the duration of the individual bits.

So as, nevertheless, to be able to transmit sufficiently rapidly a relatively large data block, required for the programming of a control unit, via a communications interface that is actually provided for connection to a CAN domain, German patent application document DE 101 53 085 A1 proposes switching over the communications interface for transmitting the data block temporarily to another communications mode, in which no bit-wise arbitration is carried out, and consequently a relatively high bit rate is possible. In this case, however, the communication with the protocols of the CAN has to be interrupted for a certain time. If, for example, based on an error, the operation of the bus system cannot be taken up again according to the CAN protocols, there is a failure of the bus system. In addition, the transmission of a relatively large data block will cause a considerable delay in the transmissions to be undertaken according to the protocols of the CAN, so that the real time properties of the CAN are impaired.

Published German patent application document DE 103 11 395 A1 describes a system in which the asynchronous, serial communication is able to take place alternatively via an asymmetrical physical protocol or via the symmetrical physical CAN protocol, and because of this, a higher data transmission rate or data transmission security is achievable for the asynchronous communication.

Published German patent application document DE 10 2007 051 657 A1 suggests using an asynchronous, rapid data transmission not conforming to the CAN in the exclusive time windows of the TTCAN protocols, so as to increase the transmitted data quantity.

G. Cena and A. Valenzano, in "Overclocking of controller area networks" (Electronics Letters, vol. 35, No. 22 (1999), p. 1924) treat, from a theoretical point of view, the effects of overclocking the bus frequency in subsections of the data frame on the effectively achieved data rate, without, however, going into details of the methodology and the various states and state transitions of the bus users.

It may be seen in the cited documents that the related art does not supply satisfactory results from every point of view.

BRIEF SUMMARY OF THE INVENTION

It is an object of the present invention to describe a method by which, in a CAN network, data frames are able to be transmitted in the shortest time and simultaneously essential properties of the CAN with regard to error detection as well as network-wide data consistency are maintained. For this purpose, a data transmission method (called Fast-CAN below) is proposed that is modified compared to the CAN protocol according to ISO 11898-1 to 4 (called standard CAN below).

According to the present invention, the object is attained in that the bit length in time is able to assume at least two different values within a data frame, for a specifiable range within the data frame, the bit length in time remaining the same for all the users on the bus, changes in the bit length in time being signaled by an identification included in the same data frame, and the changes of the bit length in time being implemented by using at least two different scaling factors between a bus time unit and the shortest time unit or the oscillator clock pulse in the running operation.

One advantage of this method is that the modification of the CAN protocol is thereby restricted to a minimum, and in particular, the structure of the CAN data frames is maintained at least for the range between the SOF and the CRC delimiter. The interface to the application program remains unchanged.

Fast-CAN controllers may also be used in standard CAN networks. In one network, which includes exclusively users having Fast-CAN controllers, switch all users after the arbitration into the fastest mode, so that all synchronization mechanisms and error detection mechanisms are able to continue fulfilling their task.

An additional advantage of this method is that a standard CAN controller only has to be changed minimally so that it is able to function as a Fast-CAN controller. A Fast-CAN controller which is also able to work as a standard CAN controller is only negligibly larger than a standard CAN controller. The application program does not have to be changed and considerable parts of the CAN Conformance Tests (ISO 16845) may be taken over.

The shortening of the bit length takes place for event-controlled communication with arbitration only after arbitration has taken place, since bus-wide data consistency is required for the arbitration, as was explained above. Beyond that, it is also possible, however, to combine the Fast-CAN protocol with the TTCAN protocol, because in the TTCAN, too, all data are transmitted in CAN data frames, whose principal construction corresponds to the specifications of ISO 11898-1. In this case, the address field and the control field could be totally or partially transmitted using a shortened bit length, at least in the exclusive time windows of the TTCAN matrix, in which no arbitration takes place but the bus access is exclusively issued.

Furthermore, it is advantageous that the transitions between the various bit lengths are able to be described by a simple status model having simply implementable transition conditions.

It is also of advantage that the switching of the bit length is able to be made by a simple adjustment of the scaling factor between the oscillator period or the smallest time unit and the bus time unit, using the baud rate prescaler, for example. The assumption in this case is naturally that the oscillator period is sufficiently short.

DETAILED DESCRIPTION OF THE INVENTION

Furthermore, exemplary embodiments are described for the method and device according to the present invention. These specific examples are used to explain the embodiment, but they do not limit the scope of the inventive thought.

Figure 1:
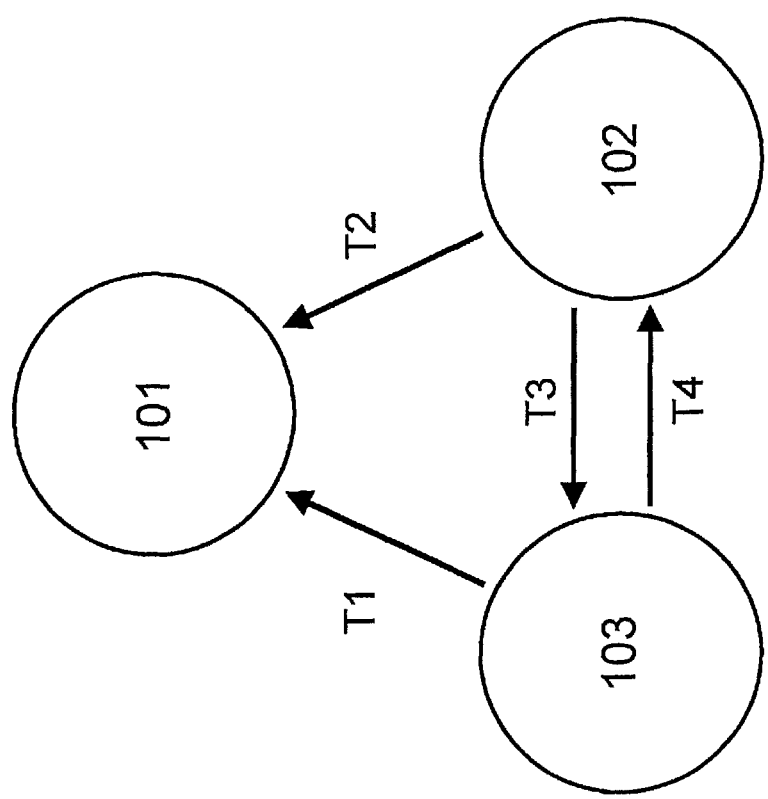
FIG. 1 shows schematically a state diagram having the various states which a Fast-CAN controller is able to occupy with regard to the method according to the present invention, as well as the transition conditions.
Figure 2:
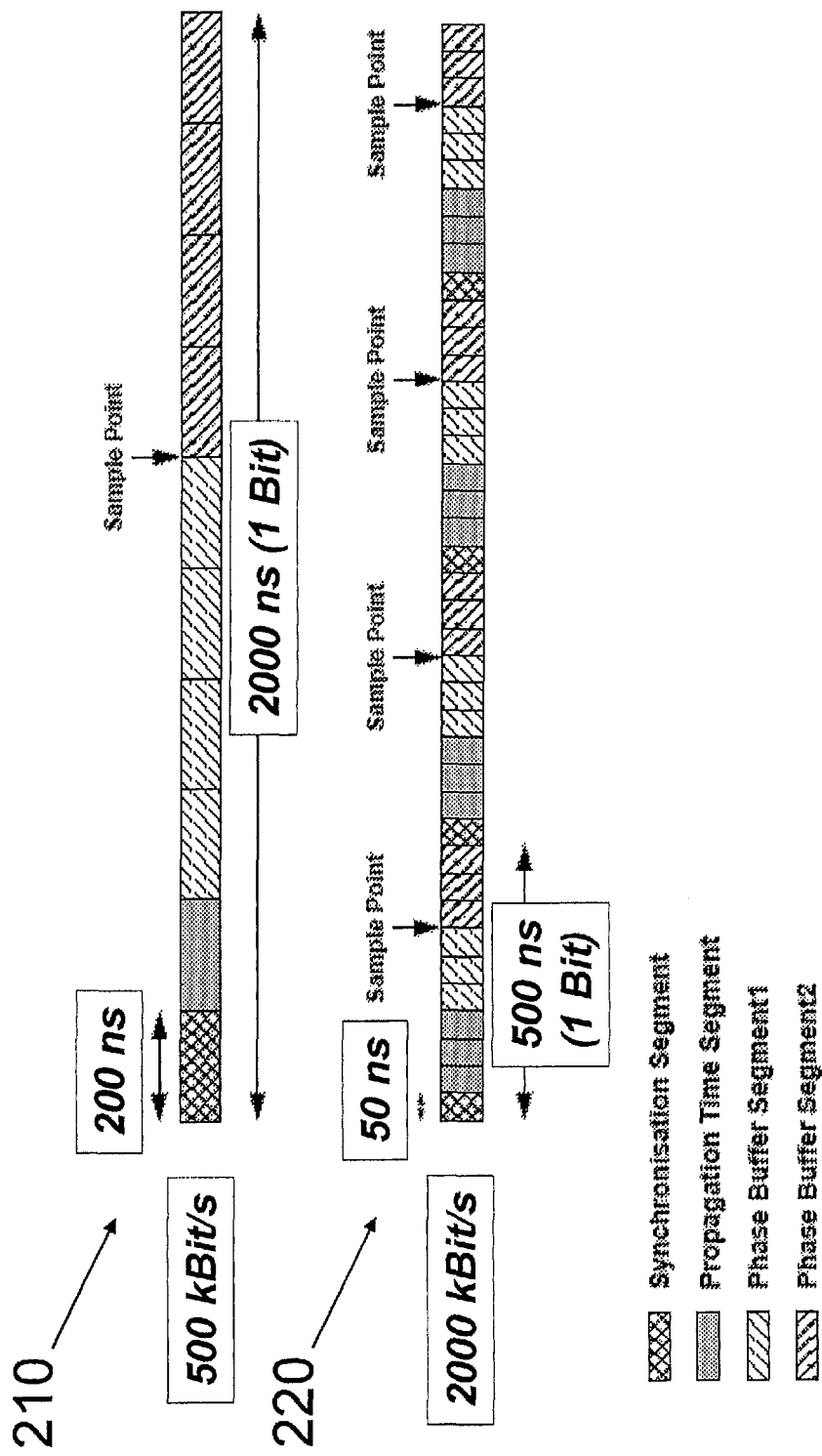
FIG. 2 shows an example for the different settings of the bit timing as a function of the transmission rate.
Figure 3:
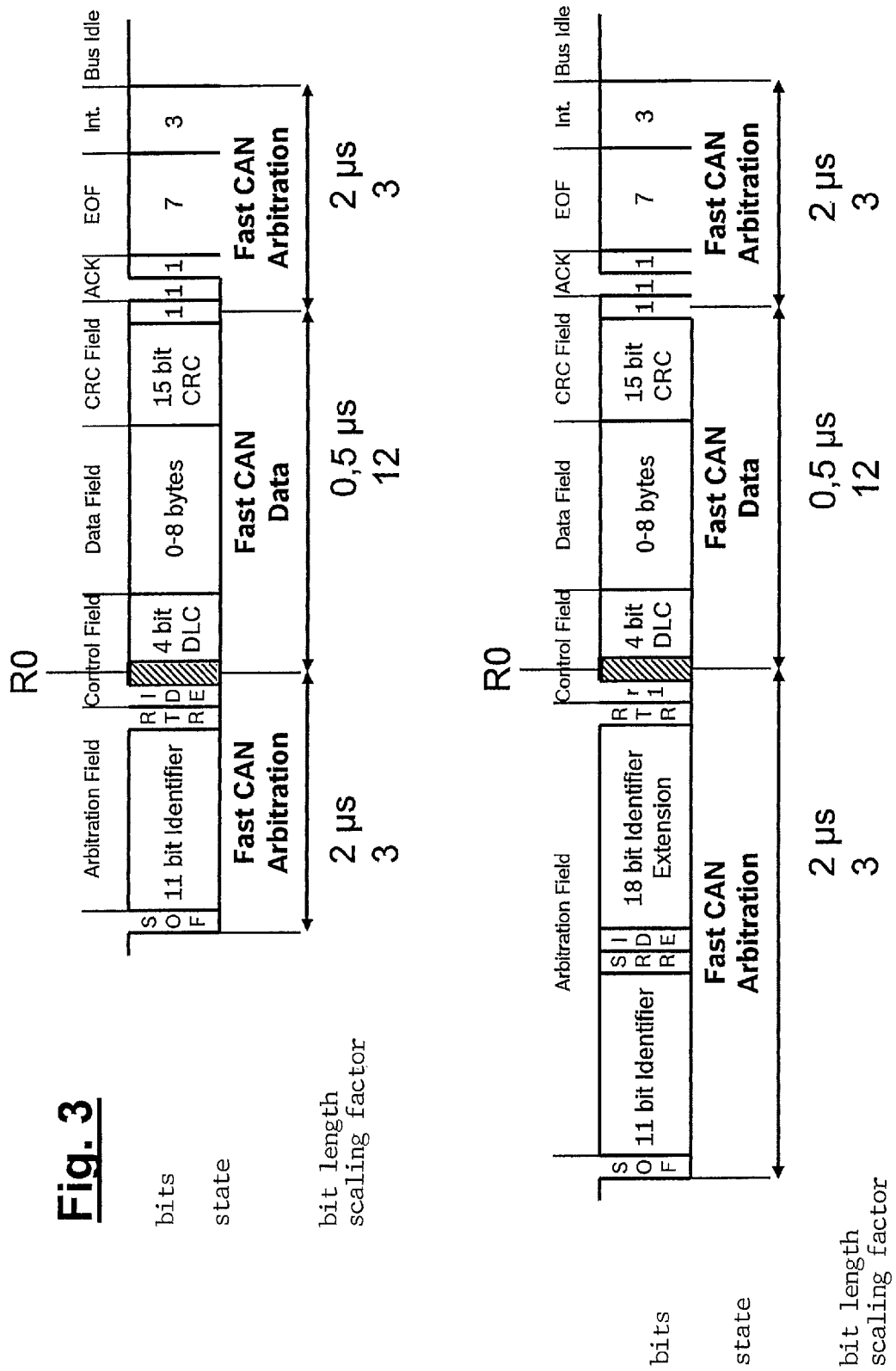
FIG. 3 shows the structure of a CAN data frame in standard format and in extended format having the subdivision, according to the present invention, into ranges of different bit length and using the identification by a reserved bit.

First of all, in a first exemplary embodiment, with the aid of FIGS. 1 through 3, we shall describe the states of the Fast-CAN controller and the associated data transmission properties, as well as their transition and the transition conditions required for this.

FIG. 1 represents the three operating states of the Fast-CAN controller: standard CAN 101, Fast-CAN-Arbitration 102 and Fast-CAN-Data 103.

In the operating state standard CAN 101, it works according to the standard CAN protocol. In the operating state, Fast-CAN arbitration 102 behaves like a standard CAN controller, but is also able to change into Fast-CAN data state 103. In Fast-CAN data state 103, it works like a standard CAN controller, but having a shorter bit time. After the switching-on, the controller is in Fast-CAN arbitration mode 102, when this is requested by the application program. Otherwise, after switching-on, it is in standard CAN mode 101.

A change is provided in the bit length in time by a change in the scaling factor ("prescaler") between the bus unit of time ("time quantum") and the smallest time unit ("minimum time quantum") or the oscillator clock pulse in running operation. The length of the bus time unit, and thus the length of the bits, is set thereby. The bit time segments, whose length is measured in bus time units, remain unchanged, and so do the rules for resynchronization and the position of the sample points. In the states Fast-CAN-Arbitration 102 and standard CAN 101, the long bus time unit is used, and in the state Fast-CAN-Data 103 the short bus time unit. Alternatively, the settings of the bit time segments could also be changed, depending on the state and the bus time unit used, which will be mentioned in greater detail in connection with FIG. 2.

In the Fast-CAN arbitration state 102, for example, "reserved bit" RO, which in the CAN frame lies before data length code DLC, is sent recessively as identification. In the standard CAN protocol it is specified that this bit has to be sent in dominant fashion. When a Fast-CAN controller receives this bit dominantly, it changes durably to the standard CAN state (state change T1 or T2). This assures that Fast-CAN and standard CAN controllers are able to be used in the same network and that then both work in the standard CAN protocol. Another bit may also be selected as identification, for which a fixed value is specified in the standard CAN protocol.

A Fast-CAN controller in the state Fast-CAN arbitration 102, which as identification, for example, recessively receives "reserved bit" RO before the DLC or successfully sends it recessively, switches over, as of the sample point of this bit, to the shorter bus time unit by switching over the scaling factor, and changes to the state Fast-CAN data 103 (state change T3). The state change may also take place using an at least approximately constant time distance or after expiration of a specified number of bus time units after the sample point.

A Fast-CAN controller in the state Fast-CAN data 103 remains in this state until one of two conditions applies:
(A) it sees a reason for starting a CAN-error frame, or
(B) the CRC delimiter is reached in the CAN frame.

If (A) or (B) is satisfied, the controller switches back into the state Fast-CAN arbitration 102 (state change T4).

In the range between DLC and CRC delimiter, according to the CAN protocol there are two reasons to start an error frame: (A1) the transmitter sees a bit error or (A2) a receiver sees a stuff error. At the end of the possibly superposed error flag, the beginning of the error delimiter, all the controllers in the network are in state Fast-CAN arbitration 102.

Both in (A1) and (A2), and also in (B), change T4 takes place into state Fast-CAN arbitration 102, and consequently the switching over of the scaling factor at the sample point at which the condition applies, or having an at least approximately constant time distance from this. The state change may also take place after the expiration of a specified number of bus time units after the sample point, for instance, at the end of phase buffer segment 2 (compare FIG. 2).

FIG. 2 describes the subdivision of each transmitted bit into bit time segments, whose length is measured in bus time units. These settings are usually configured in each bus user, and they are used to balance out signal propagation times on the bus and tolerances among the clock generators or oscillators used. In Fast-CAN controllers according to the present invention, it may now be provided that the settings of the bit time segments be taken care of individually, depending on the state and/or the currently used bus time unit. For this, the corresponding registers in which the configuration settings are stored, are doubly provided. In the example stated, the individual segments for a bit 210 are shown at a bus time unit of 200 ns, and the segments for four successive bits 220 at a bus time unit of 50 ns. For bit 210, the propagation time segment has a length of only one bus time unit, while phase buffer segment 1 and 2 occupy 4 bus time units each. However, in the case of each bit from 220, the length of the propagation time segment and phase buffer segment 1 and 2 amounts to 3 bus time units each.

In the states Fast-CAN arbitration 102 and standard CAN 101, the long bus time unit is used and the bit time segments correspond to those of bit 210 shown, and in state Fast-CAN data 103, the short bus time unit is used, and the bit time segments correspond to those of bit 220.

In particular, it may be advantageous, in the case according to the present invention, in the state Fast-CAN data to select the propagation time segment to be as small as possible, that is, for example, only one bus time unit in length, and to select the two phase buffer segments correspondingly as large as possible, in order to be able to balance out the oscillator tolerances, which are able to become relevant particularly at the high transmission rates in the state Fast-CAN data, as well as possible by the CAN resynchronization mechanism.

The design of the data frames used, the ranges having different bit lengths, their dependence upon the respective state of the controller and the identification according to the present invention will be explained below, with reference to FIG. 3.

FIG. 3 shows the structure of a CAN data frame according to ISO11898-1 in the two possible variants, the standard format and the extended format. For both variants the regions are drawn in which, according to the present invention, switching over takes place between states Fast-CAN arbitration 102 and Fast-CAN data 103. Shown also is the switching over of the bit length that goes along with this, as well as the corresponding change in the scaling factor. Finally shown, is the position selected still in this exemplary embodiment of the identification according to the present invention, in "reserved bit" RO, which is transmitted before the DLC.

The benefit of the method shown in the first exemplary embodiment for the data transmission rate is illustrated by the following calculation: We assume a length of the data field of 8 bytes, a data frame in the standard format having 11-bit addressing, as well as a baud rate of 500 kbit/s. Moreover, it is assumed that the scaling factor according to "reserved bit" RO is increased by a factor of four. In this case, the bit length, that is, according to "reserved bit" RO of 2 microseconds would be reduced to 0.5 microseconds. Ignoring possible stuff bits, in this example, per data frame, 27 bits (SOF, identifier, RTR, IDE, r0, ACK field, EOF, intermission) having normal bit length and 84 bits (DLC, data, CRC, CRC delimiter) having shortened bit length are transmitted, which yields an effective transmission performance of 111 bits in 96 microseconds. At the same assumed bus loading, this corresponds to a data transmission rate that is increased compared to the unmodified standard CAN transmission by a factor of 2.3.

In the case of otherwise equal conditions, if we assume an extended format having 29 bit addressing, then, per data frame, 47 bits having normal bit lengths and 84 bits having the shortened bit length are transmitted, which yields an effective transmission performance of 131 bits in 136 microseconds. At the same assumed bus loading, this corresponds to a data transmission rate that is increased compared to the normal transmission performance by a factor of 1.9.

One additional exemplary embodiment is shown in the following, with reference to FIGS. 4 and 5.

Figure 4:
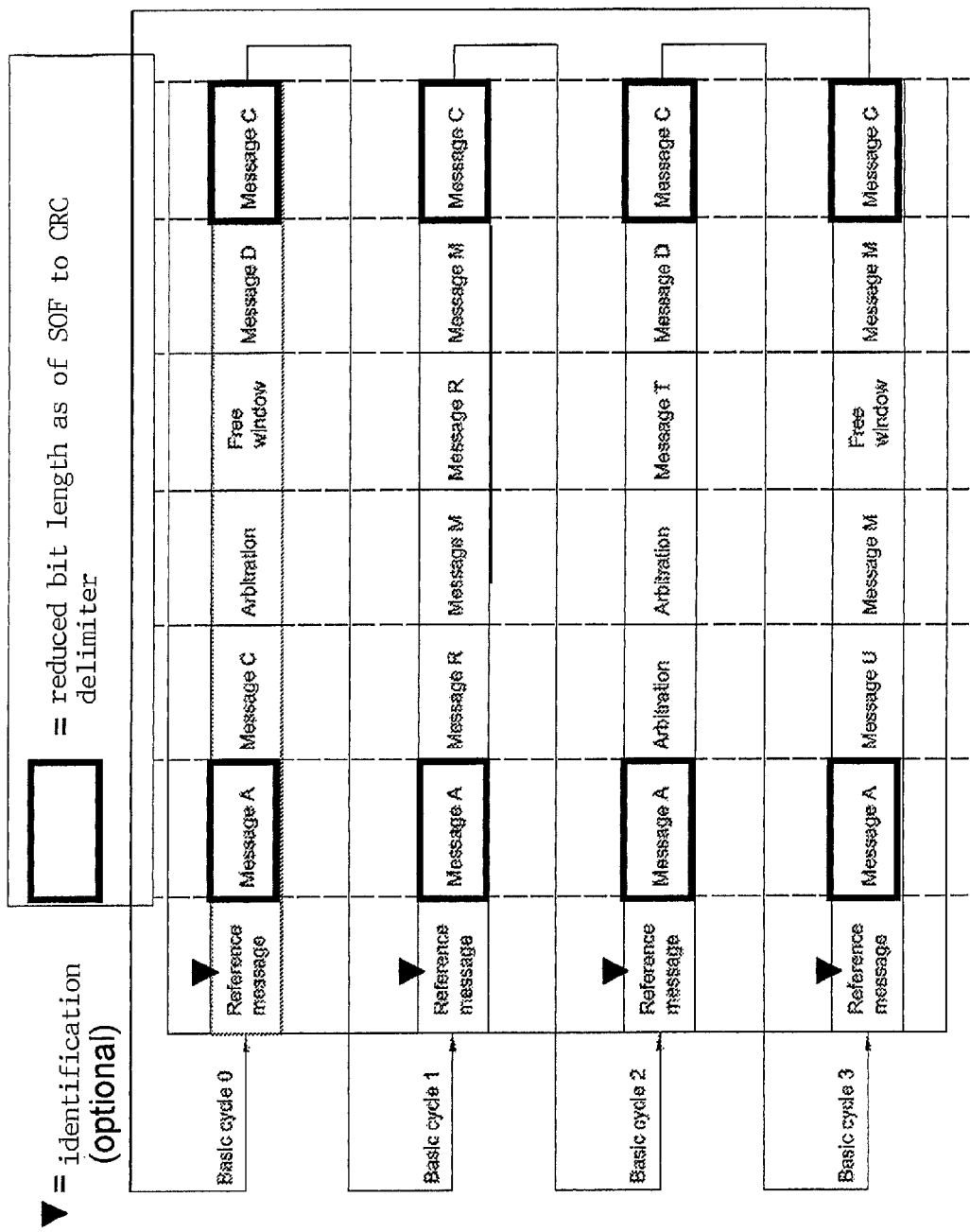
FIG. 4 shows an example for the broadening of the range of reduced bit length at a combination of the method with the time-controlled transmission method of the TTCAN protocol, represented by a system matrix.
Figure 5:
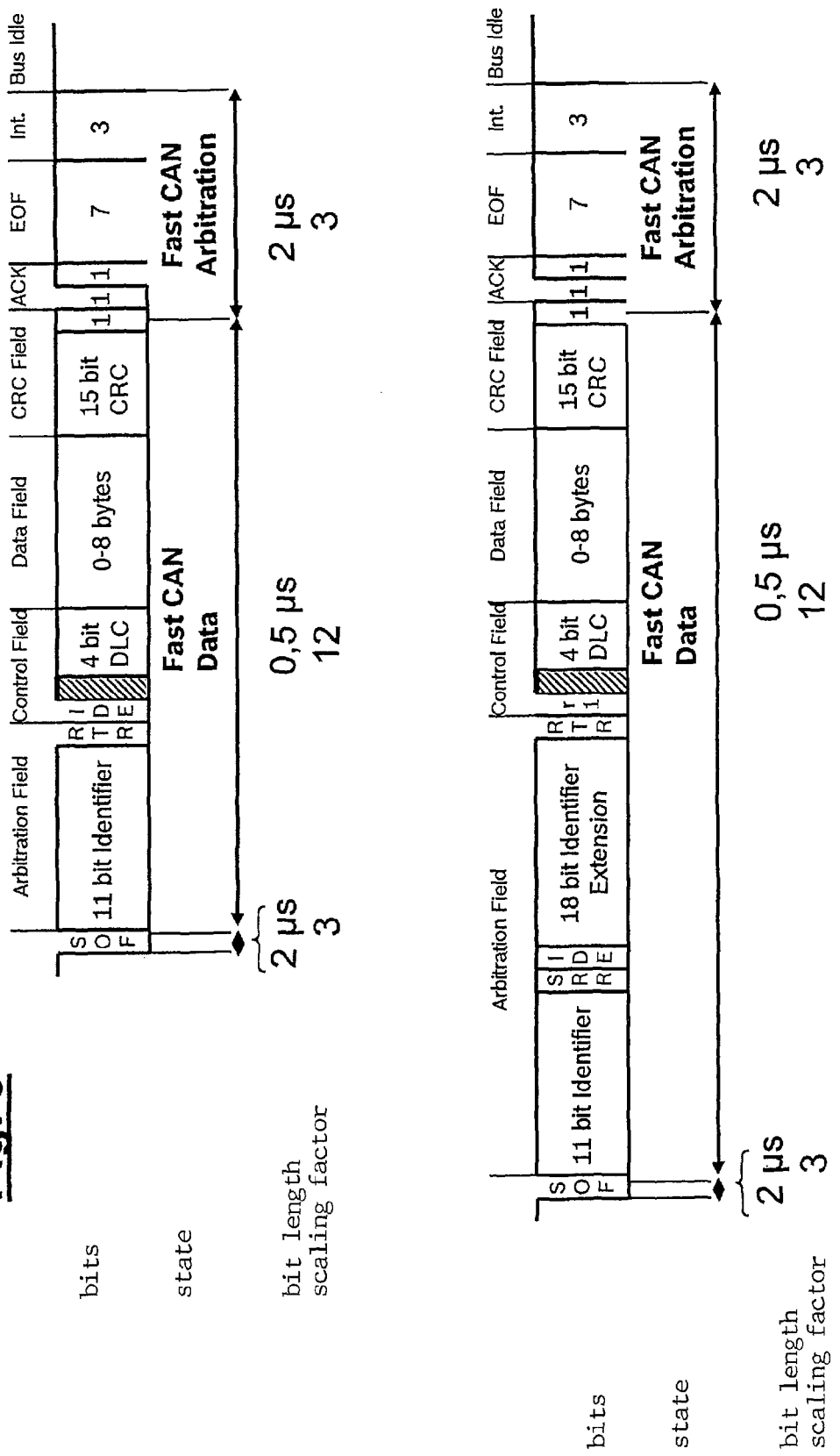
FIG. 5 shows the one possibility for subdividing a data frame in an exclusive TTCAN time window into ranges of different bit length.

FIG. 4 shows a system matrix of a TTCAN network, according to ISO11898-4, having the base cycles and time windows described. There are time windows that are designated by "message A", "message C", etc., which are available exclusively for the transmission of certain data frames, while in other time windows that are designated by "arbitration", the bus access is issued by ordinary CAN arbitration.

In the second exemplary embodiment, all data frames for which nothing else is described are treated according to the method of the first exemplary embodiment. In addition, for certain time windows fixed ahead of time that are exclusively allocated, a shortening of the bit length is undertaken, by adjusting the scaling factor even earlier, for instance, as of the SOF bit and maintained, for instance, to the end of the CRC field. One example of a data frame transmitted in such a modified manner is shown in FIG. 5. As identification for the imminent rapid transmission, for example, a reserved bit of the preceding reference message may be drawn upon. Setting this bit would signal, in the case described, that the data frames, which are transmitted in the following base cycle in exclusive time windows, are transmitted in an accelerated manner already as of the SOF bit and to the end of the CRC field, which means at reduced bit length.

In one preferred specific embodiment it is conceivable that only those exclusive data frames which are transmitted in each base cycle, that is, having repetition factor one, are additionally accelerated by the method. This case is shown in FIG. 4. This correlation is represented in FIG. 4. In the system matrix shown in exemplary fashion, the data frames designated by "message A" and "message C" would then be transmitted in an accelerated manner, according to the method explained, having a corresponding identification in the respectively preceding reference message.

For the method described in the second exemplary embodiment, it is also possible to do without the identification and to establish that, in all exclusive time windows, the data frames are basically transmitted in an established range, such as between the SOF bit and the end of the CRC field having shortened bit length. It is for this reason that, in FIG. 4, the identification is marked "optional".

The usefulness of the method in the second exemplary embodiment shown is greater than in the first example, since the bits of arbitration and control field are rapidly transmitted within the exclusive time windows. The data transmission rate actually achieved depends at least on the proportion of the exclusive time windows and the type of addressing.

Figure 6:
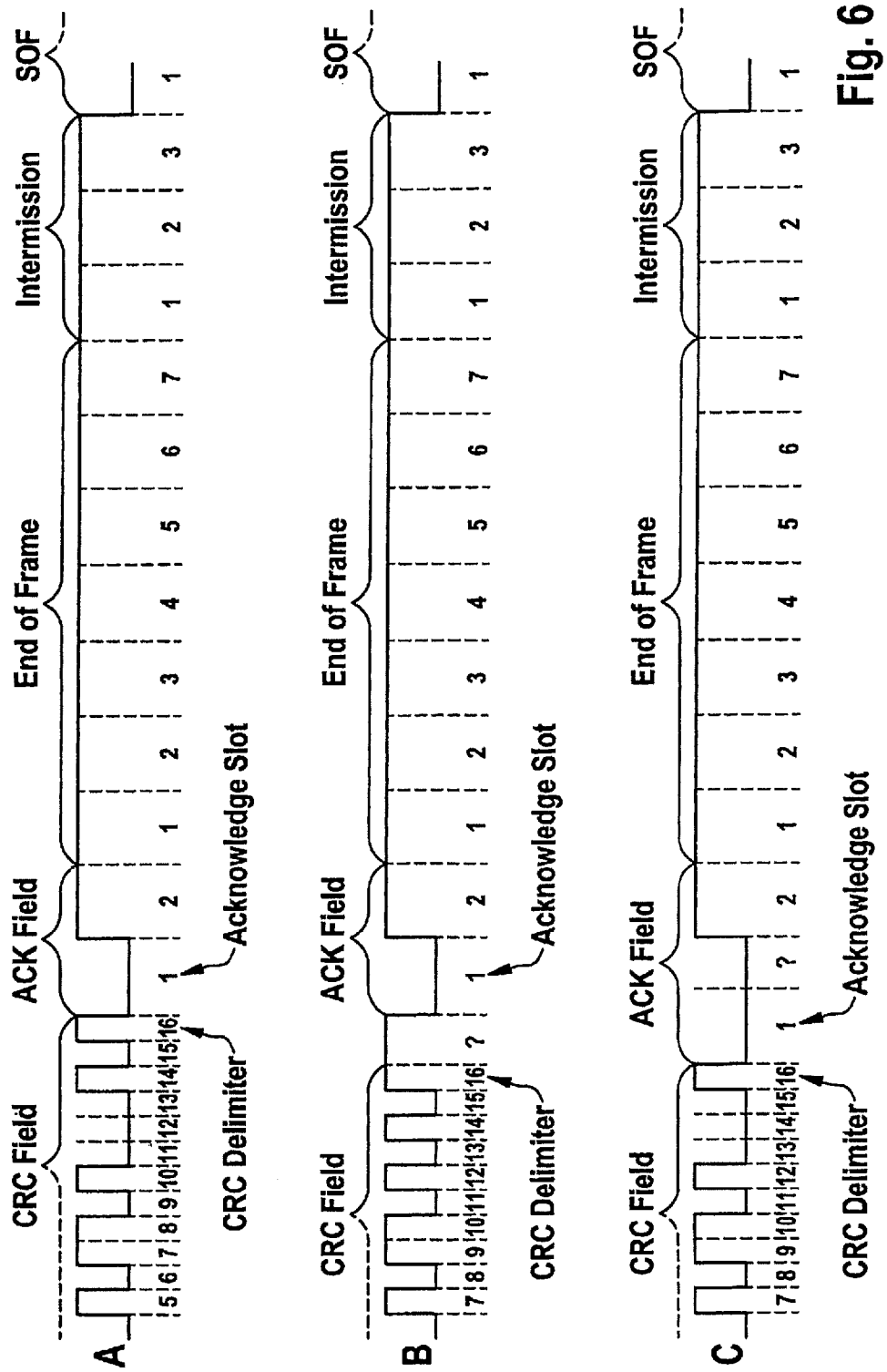
FIG. 6 shows acceptance criteria, broadened compared to the related art, for the CRC delimiter or the acknowledge bit.

A method modified compared to the method specified in ISO 11898-1 may be required in the Fast-CAN controller for handling of the transmission confirmation (CRC delimiter and acknowledge slot), as is explained in greater detail in FIG. 6.

Shown in FIG. 6 under "A" is the ideal sequence of the transition from the state Fast-CAN data to Fast-CAN arbitration at very short internal processing times and signal propagation times. The sender sends the CRC delimiter as a single recessive bit and, according to the previously described exemplary embodiments of the present invention, changes, for example, at the sample point of this CRC delimiter bit or after the passing of phase buffer segment 2, into the Fast- CAN arbitration state. At this bit position, for instance, the receivers, too, change to the state Fast-CAN arbitration. These state transitions T4 having the resetting of the scaling factor are able to take place in the various bus users at times that do not match exactly, possibly because of signal propagation times or internal processing times. That is, the participating bus users, at times that do not exactly agree, set their scaling factor for the bus time unit again to the initial state. From this, different starting, time points of the next bit result for the bus users.

After receipt of the CRC delimiter, if its CRC check was positive, each receiver sends a single dominant acknowledge bit. If this happens relatively late, because, for example, the receivers are connected at distant ends of the bus, the recessive CRC delimiter bit is able to appear longer than one bit. This case is shown in FIG. 6 under "B". By the superposition of acknowledge bits, the acknowledge slot may additionally appear longer than a bit, as shown in FIG. 6 under "C". In order to balance the phase-shifted sending times of these acknowledge bits, if necessary, the handling of these bits in Fast-CAN controllers is able to be changed to the extent that, in the state Fast-CAN arbitration, a dominant acknowledge slot of one or two bit length, which begins after the CRC delimiter, or even one bit later, is acknowledged as a valid acknowledge.

Because of the falling edge of the acknowledge bit, the bus users are subsequently synchronized again within the scope of the usual resynchronization mechanism. After the first bit of the CRC delimiter, if the sender receives not only one but two additional recessive bits, this, to him, is an acknowledge error. After the second dominant acknowledge bit, if a third dominant bit is received, this is a format error to all.

Upon the acknowledge slot, as in the standard CAN, there follows a recessive acknowledge delimiter, which is one bit long. As in the standard CAN, a Fast-CAN receiver, which has detected a CRC error, will start the error frame only in the bit after the acknowledge delimiter.

In summary, because of the present invention, there is a design approach for describing a method by which, in a CAN network, data frames are able to be transmitted in a shorter time and simultaneously essential properties of the CAN with regard to error detection as well as network-wide data consistency are maintained.

What is claimed is:

1. A method for data transmission in a network having at least two participating data processing units configured to exchange at least one data frame sent via a network bus, the data frame having a logical structure according to the CAN Specification ISO 11898-1, a bit length in time within the data frame being able to assume at least two different values, the method comprising:
   providing, for a first specifiable range within the data frame, the bit length in time to be no less than a specified minimum value of approximately one microsecond;
   providing, in at least one second specifiable range within the data frame, the bit length in time to be less than half of the bit length in time of the first specifiable range;
   wherein changes in the bit length in time are implemented by using at least two different scaling factors for setting a bus time unit relative to one of a smallest time unit or an oscillator clock pulse in running operation; and
   setting a value of an identification provided within the first specifiable range to indicate one of the at least two different values, thereby signaling a change in the bit length in time.

2. The method as recited in claim 1, wherein the second specifiable range ends one of (i) immediately after detection of a trigger event for start of an error frame, or (ii) directly after reaching a bit established for reswitching over, and the scaling factor is set in the bus users to the value of the first specifiable range.

3. The method as recited in claim 1, wherein a bus access is issued by an arbitration specified in ISO 11898-1, and the second specifiable range begins within the data frame, at the earliest, with the first bit of a data length code and, at the latest, ends with the bit of CRC delimiter.

4. The method as recited in claim 1, wherein the identification is a reserved bit within the control field of the data frame.

5. The method as recited in claim 1, wherein a bus access is issued in accordance with a time-controlled bus communication method specified in ISO 11898-4, and the second specifiable range begins within the data frame, at the earliest, with the start of frame bit of the data frame and, at the latest, ends with the bit of CRC delimiter.

6. The method as recited in claim 5, wherein the address of the data frame and the first and second specifiable ranges within the data frame are established within the scope of configuration of the time-controlled bus communication.

7. The method as recited in claim 1, further comprising:
   setting a value of an identification provided within a first specifiable range of a preceding frame to indicate one of the at least two different values, wherein changes in the bit lengths in time of the data frame are signaled by the value of the identification provided in the preceding frame.

8. The method as recited in claim 1, wherein the transition to the second specifiable range is carried out directly after a detection of the identification, and subsequently the scaling factor is adjusted.

9. The method as recited in claim 1, further comprising:
   after setting the value of the identification to a value signaling a change in the bit length in time, switching to an operating state in which the data processing unit which sent the data frame accepts, without treating as an error, at least one of (i) an acknowledgement which is one bit late, with respect to the specification ISO 11898-1, the acknowledgement regarding a correct receipt of the data frame by a receiver, and (ii) an acknowledgement slot which is at most two bits long.

10. The method as recited in claim 1, wherein different values for subdivision of the bits into bit time segments are used in the first and second specifiable ranges.

11. A control device for data transmission in a network having at least two participating data processing units and a connecting bus for transmitting at least one data frame having a logical structure according to the CAN Specification ISO 11898-1, comprising:
   means for setting a value of an identification provided within a first specifiable range of the data frame to indicate one of at least two different scaling factors for setting a bus time unit relative to one of a smallest time unit or an oscillator clock;
   wherein the two different scaling factors for setting the bus time unit result in two different bit lengths in time such that, in the first specifiable range within the data frame, the bit length in time is no less than a specified minimum value of approximately one microsecond, and in at least one second specifiable range within the data frame, the bit length in time is less than half of the bit length in time of the first specifiable range; and
   wherein the switching over of the setting of the bus time takes place in running operation.

12. The device as recited in claim 11, wherein upon one of (i) detection of a trigger event for start of an error frame, or (ii) receiving a specified identification which does not signal the use of different scaling factors, the scaling factor is set to a value which results in the bit length which is uniform in the entire data frame and corresponds to a value which conforms to the ISO 11898-1 standard.

13. The device as recited in claim 11, wherein a bus user which sends the data frame subsequently accepts, without treating as an error, at least one of (i) an acknowledgement which is one bit late, with respect to the specification ISO 11898-1, the acknowledgement regarding a correct receipt of the data frame by a receiver, and (ii) an acknowledgement slot which is at most two bits long.

* * * * *